United States Patent
Rao et al.

(10) Patent No.: US 8,689,161 B2
(45) Date of Patent: Apr. 1, 2014

(54) METHODS FOR DESIGNING INTEGRATED CIRCUITS EMPLOYING PRE-DETERMINED TIMING-REALIZABLE CLOCK-INSERTION DELAYS AND INTEGRATED CIRCUIT DESIGN TOOLS

(75) Inventors: Vishwas M. Rao, Breinigsville, PA (US); James C. Parker, Zionsville, PA (US)

(73) Assignee: LSI Corporation, Milpitas, CA (US)

( * ) Notice: Subject to any disclaimer, the term of this patent is extended or adjusted under 35 U.S.C. 154(b) by 420 days.

(21) Appl. No.: 12/831,038

(22) Filed: Jul. 6, 2010

(65) Prior Publication Data

US 2012/0011484 A1    Jan. 12, 2012

(51) Int. Cl.
*G06F 17/50*  (2006.01)

(52) U.S. Cl.
USPC .......................................... 716/114

(58) Field of Classification Search
USPC .......... 716/115, 119, 122, 103, 110, 114, 116
See application file for complete search history.

(56) References Cited

U.S. PATENT DOCUMENTS

| | | | | |
|---|---|---|---|---|
| 6,038,383 | A * | 3/2000 | Young et al. | 716/113 |
| 7,966,468 | B1 * | 6/2011 | Simeral et al. | 711/167 |
| 2004/0123259 | A1 * | 6/2004 | You et al. | 716/6 |
| 2004/0196081 | A1 * | 10/2004 | Srinivasan et al. | 327/165 |
| 2005/0268265 | A1 * | 12/2005 | Ly et al. | 716/6 |
| 2008/0086708 | A1 * | 4/2008 | Rittman | 716/11 |
| 2008/0086709 | A1 * | 4/2008 | Rittman | 716/11 |
| 2009/0224356 | A1 * | 9/2009 | Chandra | 257/499 |

FOREIGN PATENT DOCUMENTS

| | | |
|---|---|---|
| EP | 1816577 A1 | 8/2007 |
| JP | 2006085595 A | 3/2006 |

* cited by examiner

*Primary Examiner* — Vuthe Siek
*Assistant Examiner* — Mohammed Alam

(57) ABSTRACT

A method of designing an integrated circuit, an EDA tool, an apparatus and a computer-readable medium are disclosed herein. In one embodiment, the method includes: (1) generating a set of constraint equations representing clock-insertion delay values for the integrated circuit as variables, (2) determining bounds on each of the clock-insertion delay values based on the constraint equations and (3) generating a set of closing commands based on the bounds for driving a design of the integrated circuit to closure, wherein each step of the method is carried out by at least one EDA tool.

20 Claims, 2 Drawing Sheets

METHODS FOR DESIGNING INTEGRATED CIRCUITS EMPLOYING PRE-DETERMINED TIMING-REALIZABLE CLOCK-INSERTION DELAYS AND INTEGRATED CIRCUIT DESIGN TOOLS

TECHNICAL FIELD

The invention is directed, in general, to integrated circuits (ICs) and, more specifically, to methods for designing ICs.

BACKGROUND

Circuit designers use electronic design automation (EDA) tools, a category of computer aided design (CAD) tools, to create a functional circuit design, including a register transfer logic (RTL representation) representation of the functional circuit design, synthesize a "netlist" from the RTL representation, and implement a layout from the netlists. Synthesis of the netlist and implementation of the layout involve simulating the operation of the circuit and determining where cells should be placed and where the interconnects that couple the cells together should be routed. EDA tools allow designers to construct a circuit, simulate its performance, estimate its power consumption and area and predict its yield using a computer and without requiring the costly and lengthy process of fabrication. EDA tools are indispensable for designing modern ICs, particularly very-large-scale integrated circuits (VLSIs). For this reason, EDA tools are in wide use.

One such EDA tool performs timing signoff. Timing signoff is one of the last steps in the IC design process and ensures that signal propagation speed in a newly-designed circuit is such that the circuit will operate as intended. Signals that propagate too slowly through various time domains of an integrated circuit cause setup violations; signals that propagate too quickly through the various time domains cause hold violations. Setup or hold violations frustrate the logic of the circuit and prevent it from performing the job it was designed to do.

Even with EDA tools designed to coordinate the timing in integrated circuits, current design methodologies are limited at the point of clock-tree-synthesis (CTS). Typical design methodologies for integrated circuits with multiple clock domains require the design team provide estimates of clock-insertion delays based on designer knowledge, or use a tool to attempt to minimize the delays on all the clocks. Given the complexity of inter-clock transfers in modern designs and the sheer number of clock domains, it is usually not possible for the design team to understand all the inter-clock transfers that can be impacted by the clock-tree insertion delays. This can result in situations where the design team cannot predict best possible insertion delays, or the tool attempts to build a clock network without analysis as to whether it is optimal, or even realizable under the given set of constraints. Accordingly, problems with the design of the integrated circuit often occur.

SUMMARY

In one aspect, a method of designing an integrated circuit is provided. In one embodiment, the method includes: (1) generating a set of constraint equations representing clock-insertion delay values for the integrated circuit as variables, (2) determining bounds on each of the clock-insertion delay values based on the constraint equations and (3) generating a set of closing commands based on the bounds for driving a design of the integrated circuit to closure, wherein each step of the method is carried out by at least one EDA tool.

Another aspect of the invention provides an EDA tool. In one embodiment, the EDA tool includes: (1) a constraint modeler configured to generate a set of constraint equations representing clock-insertion delay values for an integrated circuit as variables, (2) a timing constraint analyzer configured to determine bounds on each of the clock-insertion delay values based on the constraint equations and (3) a design closer configured to generate a set of closing commands based on the bounds and drive a design of the integrated circuit to closure.

In yet another aspect, an apparatus is provided. In one embodiment, the apparatus includes: (1) circuitry for generating a set of constraint equations representing clock-insertion delay values for the integrated circuit as variables, (2) circuitry for determining bounds on each of the clock-insertion delay values based on the constraint equations and (3) circuitry for generating a set of closing commands based on the bounds for driving a design of the integrated circuit to closure.

In still yet another aspect, a computer-readable medium is disclosed. In one embodiment, the computer-readable medium has stored thereon instructions that, when executed, implement a method for designing an integrated circuit, the method including: (1) generating a set of constraint equations representing clock-insertion delay values for the integrated circuit as variables, (2) determining bounds on each of the clock-insertion delay values based on the constraint equations and (3) generating a set of closing commands based on the bounds for driving a design of the integrated circuit to closure.

The foregoing has outlined certain aspects and embodiments of the invention so that those skilled in the pertinent art may better understand the detailed description of the invention that follows. Additional aspects and embodiments will be described hereinafter that form the subject of the claims of the invention. Those skilled in the pertinent art should appreciate that they can readily use the disclosed aspects and embodiments as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION OF CERTAIN ASPECTS AND EMBODIMENTS

Figure 1:
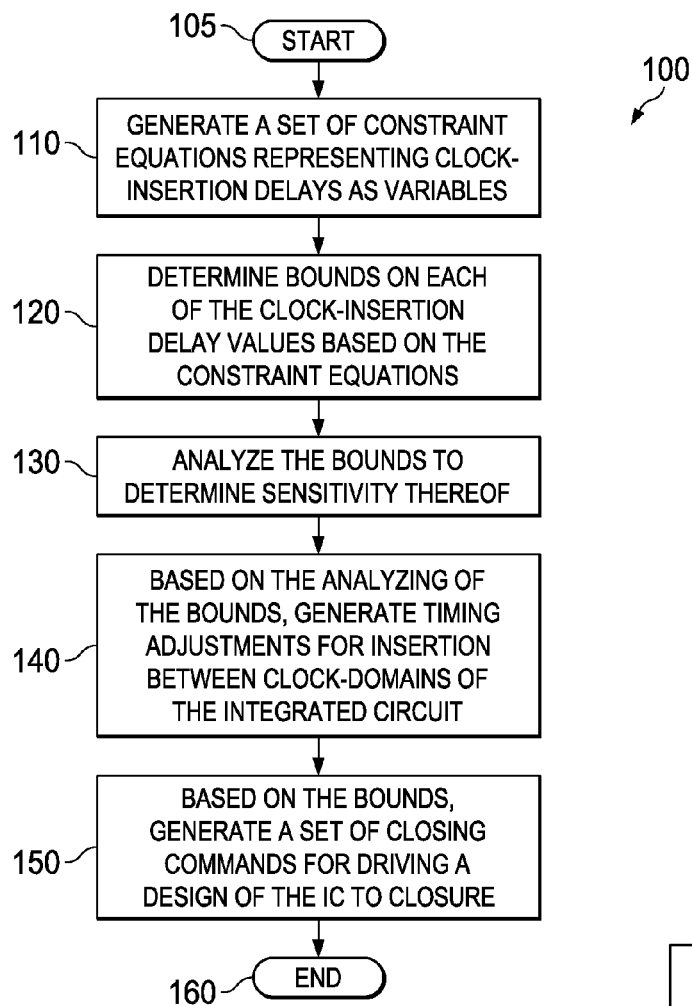
FIG. 1 is a flow diagram of an embodiment of method of for designing an IC carried out according to the principles of the disclosure.

The complexity of inter-clock transfers between multiple clock domains can result in timing problems in the designs of modern integrated circuits. For example, if CTS is driven in the absence of insertion delay targets, CAD tools may target the smallest insertion delay targets for the different clock domains. This can result in inter-clock timing violations post-CTS, which can require several iterations for fixing. Additionally, if the design team provides insertion delay targets, these are likely based on intuition and can result in non-optimal clock-structures, again, leading to timing violations and expensive iterations. Furthermore, given a design of an integrated circuit and a set of constraints, the inter-clock relationships and transfers between the various clock domains may be such that there are no viable clock-insertion solutions (accounting for relative skew) that can result in design closure. If such a situation exists, the design teams may spend a tremendous amount of post-CTS time trying to fix a problem that could have been caused by an incorrect constraint specification.

Detection of the timing issues in the integrated circuit design can reduce the amount of time in the design process. As such, this disclosure provides an analytical model to arrive at insertion delay bounds for clocks (e.g., all the clocks) in the design of an integrated circuit early in the design process, such as at the "post-placement pre-CTS" stage. Analysis of these bounds presented early in the design process can accelerate design closure. Design closure involves carrying out the steps of placement, CTS and routing to generate a design-rule and timing clean database for an integrated circuit or block. Associated with design closure are closing commands that are directives for driving the CTS and clock-tree-optimization for the integrated circuit. Design closure may be accelerated by, for example: (1) providing valid insertion delay targets for the given design (and constraint-set) to enable pre-CTS and post-CTS timing consistency, (2) permitting early timing analysis with valid clock-tree-insertion estimates (using clock latency) and (3) identifying if a high sensitivity exists for any given set of insertion delays for the design.

Thus, the embodiments disclosed herein advantageously use early timing information to set up a mathematical model and then solve the model to determine the bounds for clock-insertion delay targets and sensitivity information associated with the bounds. Design teams can then use the pre-determined, timing-realizable clock-insertion delays that are obtained for the design closure process. In addition to using the obtained bounds and sensitivity information for timing optimization, the obtained information can also be used for optimizing the integrated circuit design to lower the power or noise in the design. For example, if a clock has lower sensitivity, the transition times of the integrated circuit can be relaxed so it consumes lower power and produces lower noise.

FIG. 1 illustrates a flow diagram of an embodiment of a method 100 for designing an IC carried out according to the principles of the disclosure. The method 100 may be used to drive the CTS for the IC by, for example, sequencing and guiding it, followed by clock-tree-optimization. The method 100 may be used as an analytical method that determines if an IC design is "close-able" and if so, what the right relative clock-tree insertion delays are to achieve this closure. Furthermore, if the design is close-able, then the information obtained by the method 100 can also be used to optimize the IC for lower power, for example, by relaxing the transition time on clock domains that are not very sensitive to insertion delay ranges.

A test apparatus may include the necessary logic circuitry to carry out the method 100. In one embodiment, the method 100 may be embodied as a series of operating instructions that are stored on a computer readable medium and used to direct the operation of a processor when initiated thereby. In some embodiments, each step of the method 100 may be accomplished by employing an EDA tool or a plurality of EDA tools. As such, different EDA tools may be used for each step of the method 100 or for at least two different steps of the method 100. Some of the EDA tools may be commercially available tools that are commonly used for IC design and have been modified to perform functions disclosed herein. In some embodiments, proprietary EDA tools may be used. The method 100 begins in a step 105.

Figure 2:
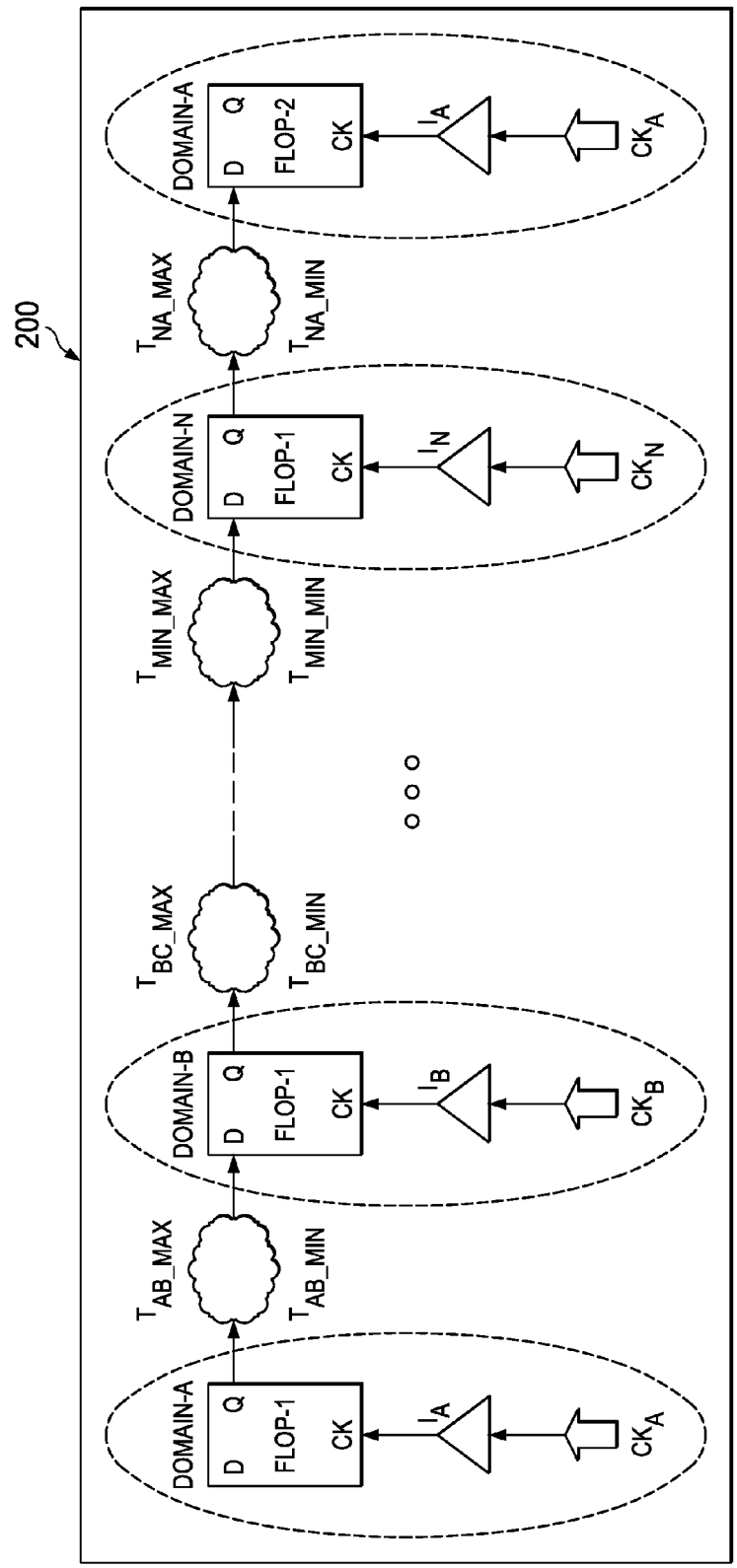
FIG. 2 is a generalized topology of an embodiment of an IC having multiple clock domains.

In a step 110, a set of constraint equations representing clock-insertion delay values as variables are generated for the integrated circuit. A clock-insertion delay value is the amount of time a clock-signal can take from its source point (start of the clock tree) to the termination point (clock-pin of the flops). The set of constraint equations may represent a range of realizable clock-insertion delay values for the integrated circuit. To provide an example of the constraint equations representing the clock-insertion delay values, a generalized topology of an integrated circuit 200 having multiple clock domains is illustrated in FIG. 2. Each cloud between the clock domains of FIG. 2 represents data paths between the clock domains (i.e., clock domains Domain-A, Domain-B and Domain-N). The clock-insertion delay for a Domain-X is represented by $I_X$ in FIG. 2. For example, $I_A$ represents the clock-insertion delay for clock Domain-A. Similarly, $T_{XY\text{-}MAX}$ represents the maximum data-path delay from Domain-A to Domain-Y and $T_{XY\text{-}MIN}$ represent the minimum data-path delay from Domain-A to Domain-Y. To account for inter-clock-period, setup-timing, and timing constraints including multi-cycle-path, setup adjustment may be needed for data transfers from Domain-X to Domain-Y (i.e., SetupAdjust(XY)). To account for inter-clock-period, hold-timing, and timing constraints including multi-cycle-path, hold adjustments for data transfers from Domain-X to Domain-Y may be needed (i.e., HoldAdjust(XY)). Using this notation and in view of FIG. 2, a set of constraint equations can be generated as follows:

---

```
for each X in {A, B, ..., N} {
    for each Y in {A, B, ..., N} {
        /* Analyze inter-clock constraints */
        if { X is not equal to Y } {
            if { Valid paths exist from Domain-X to Domain-Y } {
                compute the delay values T_XY-MAX and T_XY-MIN using a
pre-CTS placed global routed database
                set up the two insertion delay constraint equations {
                    I_Y - I_X + SetupAdjust (XY) > T_XY-MAX
                    I_X - I_Y + HoldAdjust (XY) > T_XY-MIN
                }
            }
        }
    }
}
```

---

The set of constraint equations can then be expressed as follows:

$X$ in $\{A, B, \ldots, N\}$;

$Y$ in $\{A, B, \ldots, N\}$;

$I_Y - I_X + \text{SetupAdjust}(XY) > T_{XY\text{-}MAX}$ $I_X - I_Y + \text{HoldAdjust}(XY) > T_{XY\text{-}MIN}$.

The set of constraint equations may be generated by first using a computer program that generates timing reports for the longest paths and the shortest paths (along with the setup and hold margin) for clock-to-clock transfers of the integrated circuit. A conventional EDA tool, such as, a place-and-route tool or a timer tool may be used to generate the timing reports. The data of the timing reports may then be parsed to build the set of equations. A parsing program, such as one developed using the programming language Perl, may be used to parse the timing reports. A proprietary parsing program may be used. Parameters do not need to be entered into the parsing program since the parameters can be derived from the data-set of the timing reports. The equations generated from the parsing program can then be put into a conventional solver, such as the solver from Microsoft Excel®, to determine the insertion ranges.

Bounds on each of the clock-insertion delay values are determined based on the constraint equations in a step 120. Bounds are the minimum and maximum delay values of clock-insertion that do not violate the timing constraints. Determining the bounds may include solving a set of constraint equations for clock-insertion delay values of an integrated circuit. For example, employing the above set of constraint equations,
P in $\{A, B, \ldots, N\}$; $l_p <= I_p <= u_p$; where $l_p$ is the lower bound and $u_p$ is the upper bound on the insertion delay $I_p$.

$I_p$ represents the clock-insertion delay for clock Domain-P with $l_p$ being the lower bound and $u_p$ being the upper bound. Each clock has a bound (or range) for the insertion delay. The bounds represent the extreme points on this range. A conventional solver, such as the Microsoft Excel® solver, may be used to solve bound equations.

In a step 130, the bounds are analyzed to determine sensitivity thereof. Sensitivity of the design to a clock is high if variations in clock-insertion-delay of that clock can impact many timing paths. Sensitivity of a clock is low if the timing on the design is relatively insensitive to the clock-insertion delay on that clock. The sensitivity of the bounds may be based on variations in each of the clock-insertion delay values. For example, the relative magnitudes of $u_p - l_p$ (for each P in $\{A, B, \ldots, N\}$) may be analyzed with reference to the clock-period, uncertainty and insertion delays to determine the sensitivity of the solution.

Timing adjustments are generated in a step 140 for insertion between clock-domains of the integrated circuit based on the analyzing of the bounds. The timing adjustments may include set up adjustments or hold adjustments for insertion between the clock domains. Timing adjustments are adjustments to relative insertion delays of clock domains to minimize the amount of setup and hold correction required across domains. Unlike conventional processes where timing adjustments are manually made, the generated timing adjustments may be automatically applied employing an EDA tool.

In a step 150, a set of closing commands are generated based on the bounds for driving a design of the integrated circuit to closure. The generated closing commands, for example, include CTS-sequencing, post-CTS clock optimization and route-optimization. Driving the design to closure may include driving timing analysis of the integrated circuit and driving synthesis of a clock tree for the integrated circuit. The method 100 then ends in a step 160

Figure 3:
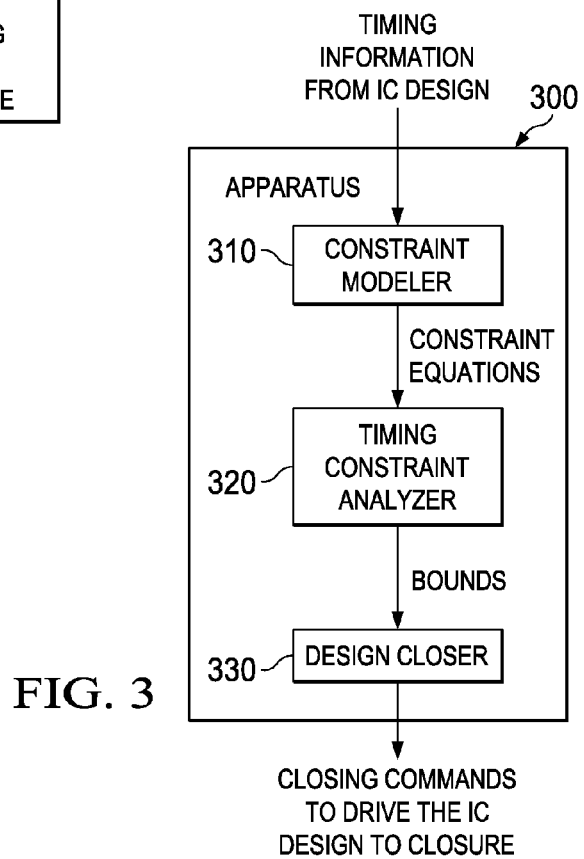
FIG. 3 is a block diagram of an embodiment of an apparatus constructed according to the principles of the present disclosure.

FIG. 3 is a block diagram of an embodiment of an apparatus 300 constructed according to the principles of the present disclosure. To perform the described functions, the apparatus 300 may be embodied as a series of operating instruction stored on a computer-readable medium that directs the operation of a processor when initiated thereby. In one embodiment, the apparatus 300 may be a dedicated computing device including the necessary circuitry (including a processor and memory) or software to perform the described functions. The apparatus 300 may be an EDA tool. In some embodiments, the apparatus 300 or parts of the apparatus may be a proprietary EDA tool. Additionally, the apparatus 300 may include multiple EDA tools. The apparatus 300 includes a constraint modeler 310, a timing constraint analyzer 320 and a design closer 330.

The constraint modeler 310 is configured to generate a set of constraint equations representing clock-insertion delay values for an integrated circuit as variables. The timing constraint analyzer 320 is configured to determine bounds on each of the clock-insertion delay values based on the constraint equations. The timing constraint analyzer 320 is further configured to analyze the bounds to determine sensitivity thereof. The sensitivity of the bounds may be based on variations in each of the clock-insertion delay values. The timing constraint analyzer 320 may be configured to determine the bounds on each of the clock-insertion delay values by solving the set of constraint equations.

The design closer 330 is configured to generate a set of closing commands based on the bounds and drive a design of the integrated circuit to closure. The design closer 330 is further configure to generate timing adjustments for insertion between clock-domains of the integrated circuit based on the bounds. In one embodiment, the timing adjustments may include set up adjustments or hold adjustments for insertion between the clock domains. The design closer 330 may also be configured to drive the design to closure by driving timing analysis of the integrated circuit and driving synthesis of a clock tree for the integrated circuit.

The above-described apparatuses and methods may be embodied in or performed by various conventional digital data processors or computers, wherein the computers are programmed or store executable programs of sequences of software instructions to perform one or more of the steps of the methods, e.g., steps of the method of FIG. 1. The software instructions of such programs may represent algorithms and be encoded in machine-executable form on conventional digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method of FIG. 1. Additionally, an apparatus, such as dedicated test equipment, may be designed to include the necessary circuitry to perform each step of the methods of FIG. 1.

Those skilled in the art to which the invention relates will appreciate that other and further additions, deletions, substitutions and modifications may be made to the described embodiments without departing from the scope of the invention.

What is claimed is:

1. A method of designing an integrated circuit, comprising:
generating a set of constraint equations representing clock-insertion delay values for said integrated circuit as variables;
determining bounds on each of said clock-insertion delay values based on said constraint equations wherein said bounds are minimum and maximum values that define a range in which said clock-insertion delay values comply with timing constraints of said integrated circuit; and
generating a set of closing commands based on said bounds for driving a design of said integrated circuit to closure, wherein said determining said bounds is performed by a processor employing pre-clock tree synthesis data of said design and said closing commands are directives for driving clock-tree-synthesis and clock-tree-optimization for said integrated circuit.

2. The method as recited in claim 1 further comprising analyzing said bounds to determine sensitivity thereof.

3. The method as recited in claim 2 wherein said sensitivity of said bounds is based on variations in each of said clock-insertion delay values.

4. The method as recited in claim 1 further comprising generating timing adjustments for insertion between clock-domains of said integrated circuit based on said analyzing of said bounds.

5. The method as recited in claim 4 wherein said timing adjustments include set up adjustments or hold adjustments for insertion between said clock domains.

6. The method as recited in claim 1 wherein said driving a design to closure includes driving timing analysis of said integrated circuit and driving synthesis of a clock tree for said integrated circuit.

7. The method as recited in claim 1 wherein determining said bounds includes solving said set of constraint equations.

8. The method as recited in claim 1 wherein said set of constraint equations represent a range of realizable clock-insertion delay values for said integrated circuit.

9. An integrated circuit constructed according to the method of claim 1.

10. An electronic design automation tool embodied as a series of operating instructions stored in a non-transitory computer readable medium that direct the operation of a processor when executed, said electronic design automation tool comprising:
  a constraint modeler configured to generate a set of constraint equations representing clock-insertion delay values for an integrated circuit as variables;
  a timing constraint analyzer configured to determine bounds on each of said clock-insertion delay values based on said constraint equations wherein said bounds are minimum and maximum values that define a range in which said clock-insertion delay values comply with timing constraints of said integrated circuit; and
  a design closer configured to generate a set of closing commands based on said bounds and drive a design of said integrated circuit to closure wherein said timing constraint analyzer is configured to determine said bounds employing pre-clock tree synthesis data of said design and said closing commands are directives for driving clock-tree-synthesis and clock-tree-optimization for said integrated circuit.

11. The electronic design automation tool as recited in claim 10 wherein said timing constraint analyzer is further configured to analyze said bounds to determine sensitivity thereof.

12. The electronic design automation tool as recited in claim 11 wherein said sensitivity of said bounds is based on variations in each of said clock-insertion delay values.

13. The electronic design automation tool as recited in claim 10 wherein said design closer is further configured to generate timing adjustments for insertion between clock-domains of said integrated circuit based on said bounds.

14. The electronic design automation tool as recited in claim 13 wherein said timing adjustments include set up adjustments or hold adjustments for insertion between said clock domains.

15. The electronic design automation tool as recited in claim 10 wherein said design closer is configured to drive said design to closure by driving timing analysis of said integrated circuit and driving synthesis of a clock tree for said integrated circuit.

16. The electronic design automation tool as recited in claim 10 wherein said timing constraint analyzer is configured to determine said bounds on each of said clock-insertion delay values by solving said set of constraint equations.

17. A non-transitory computer-readable medium having stored thereon instructions that, when executed by a processor, implement a method for designing an integrated circuit, said method comprising:
  generating a set of constraint equations representing clock-insertion delay values for said integrated circuit as variables;
  determining bounds on each of said clock-insertion delay values based on said constraint equations wherein said bounds are minimum and maximum values that define a range in which said clock-insertion delay values comply with timing constraints of said integrated circuit; and
  generating a set of closing commands based on said bounds for driving a design of said integrated circuit to closure wherein said determining said bounds is based on re-clock tree synthesis data of said design and said closing commands are directives for driving clock-tree-synthesis and clock-tree-optimization for said integrated circuit.

18. The computer-readable medium as recited in claim 17 further comprising analyzing said bounds to determine sensitivity thereof.

19. The computer-readable medium as recited in claim 17 further comprising generating timing adjustments for insertion between clock-domains of said integrated circuit based on said analyzing of said bounds.

20. An apparatus, comprising:
  circuitry for generating a set of constraint equations representing clock-insertion delay values for said integrated circuit as variables;
  circuitry for determining bounds on each of said clock-insertion delay values based on said constraint equations wherein said bounds are minimum and maximum values that define a range in which said clock-insertion delay values comply with timing constraints of said integrated circuit; and
  circuitry for generating a set of closing commands based on said bounds for driving a design of said integrated circuit to closure, wherein said determining said bounds is based on pre-clock tree synthesis data of said design and said closing commands are directives for driving clock-tree-synthesis and clock-tree-optimization for said integrated circuit.

* * * * *